US009572197B1

(12) United States Patent
Wurtenberger et al.

(10) Patent No.: US 9,572,197 B1
(45) Date of Patent: Feb. 14, 2017

(54) CONFIGURATION OF REMOTE RADIO HEAD ANTENNA PORTS

(75) Inventors: Andrew Mark Wurtenberger, Olathe, KS (US); Clark Douglas Halferty, Lee's Summit, MO (US); Caleb S. Hyde, Kansas City, MO (US); Rajveen Narendran, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 86 days.

(21) Appl. No.: 13/240,659

(22) Filed: Sep. 22, 2011

(51) Int. Cl.
*H04W 88/06* (2009.01)
*H04W 72/04* (2009.01)
*H04W 16/02* (2009.01)
*H04W 88/08* (2009.01)
*H04W 92/12* (2009.01)

(52) U.S. Cl.
CPC ........... *H04W 88/085* (2013.01); *H04W 16/02* (2013.01); *H04W 72/04* (2013.01); *H04W 88/08* (2013.01); *H04W 92/12* (2013.01)

(58) Field of Classification Search
CPC ...... H04W 72/04; H04W 88/08; H04W 76/00; H04W 88/085; H04W 16/02; H04W 92/12
USPC ................................ 370/355, 328; 455/422.1
See application file for complete search history.

(56) References Cited

U.S. PATENT DOCUMENTS

| | | | | |
|---|---|---|---|---|
| 7,423,994 | B2* | 9/2008 | Liu et al. | 370/331 |
| 8,010,099 | B2* | 8/2011 | Ma et al. | 455/422.1 |
| 8,194,597 | B2* | 6/2012 | Feder et al. | 370/328 |
| 8,289,910 | B2* | 10/2012 | Gabriel et al. | 370/329 |
| 8,345,602 | B2* | 1/2013 | Mizusawa | 370/328 |
| 2010/0234037 | A1 | 9/2010 | Terry et al. | |
| 2010/0303039 | A1 | 12/2010 | Zhang et al. | |
| 2012/0113852 | A1* | 5/2012 | Xu et al. | 370/252 |
| 2013/0322581 | A1* | 12/2013 | Piirainen et al. | 375/343 |

* cited by examiner

*Primary Examiner* — Alpus H Hsu
*Assistant Examiner* — Anthony Luo

(57) ABSTRACT

A method of operating a wireless transmission system having antenna elements that are driven by corresponding antenna ports is disclosed. The method includes, in a base system, transmitting a first antenna port configuration for receipt by a remote radio head. The method also includes, in the remote radio head, allocating first communication signals among the antenna ports based on the first antenna port configuration, and transmitting the first communication signals to the antenna ports for wireless transfer to user devices. The method also includes, in the base system, identifying active sets that indicate active pilot signals for the user devices, processing the active sets to identify a second antenna port configuration, and transmitting the second antenna port configuration for receipt by the remote radio head. The method also includes, in the remote radio head, allocating second communication signals among the antenna ports based on the second antenna port configuration.

16 Claims, 5 Drawing Sheets

CONFIGURATION OF REMOTE RADIO HEAD ANTENNA PORTS

TECHNICAL FIELD

Aspects of the disclosure are related to the field of communications, and in particular, configuration of remote radio head antenna ports for wireless transmission of communication signals in wireless communication networks.

TECHNICAL BACKGROUND

Wireless communication networks and systems typically include wireless access nodes, such as base stations, distributed across a geographic area to provide user devices with wireless access to communication services. The communication services could include voice calls, text messaging, and Internet services. These wireless access nodes each include transceiver equipment, such as amplifiers, antenna elements, or other radio equipment, which provide the wireless access within associated wireless coverage areas.

In some examples, the wireless access nodes include remote radio heads in which amplification and antenna portions are located remotely from a base control unit. The remote radio head could be located at the top of a support structure, such as a radio tower, whereas the base control unit could be located on the ground or in a centralized location. Remote radio heads could also include input ports for receiving user communications and control instructions from the base control unit, and multiple output ports to transmit communication signals for wireless transmission by the associated antenna elements.

Overview

A method of operating a wireless transmission system having a plurality of antenna elements that are driven by corresponding plurality of antenna ports is disclosed. The method includes, in a base system, transmitting first user signals and first control instructions indicating a first antenna port configuration for the first user signals. The method also includes, in a remote radio head, receiving the first user signals and the first control instructions indicating the first antenna port configuration, generating first communication signals for the antenna ports based on the first user signals and the first antenna port configuration where the first antenna port configuration allocates the first communication signals among the antenna ports, and transmitting the first communication signals to the antenna ports for wireless transfer to user devices. The method also includes, in the base system, identifying active sets that indicate active pilot signals for the user devices, processing the active sets to identify a second antenna port configuration, and transmitting second user signals and second control instructions indicating the second antenna port configuration for the second user signals. The method also includes, in the remote radio head, receiving the second user signals and the second control instructions indicating the second antenna port configuration, generating second communication signals for the antenna ports based on the second user signals and the second antenna port configuration where the second antenna port configuration allocates the second communication signals among the antenna ports, and transmitting the second communication signals to the antenna ports for wireless transfer to the user devices.

A wireless transmission system having a plurality of antenna elements that are driven by corresponding plurality of antenna ports is also disclosed. The wireless transmission system comprises a base system configured to transmit first user signals and first control instructions indicating a first antenna port configuration for the first user signals. The wireless transmission system also comprises a remote radio head configured to receive the first user signals and the first control instructions indicating the first antenna port configuration, generate first communication signals for the antenna ports based on the first user signals and the first antenna port configuration where the first antenna port configuration allocates the first communication signals among the antenna ports, and transmit the first communication signals to the antenna ports for wireless transfer to user devices. The base system is also configured to identify active sets that indicate active pilot signals for the user devices, process the active sets to identify a second antenna port configuration, and transmit second user signals and second control instructions indicating the second antenna port configuration for the second user signals. The remote radio head is also configured to receive the second user signals and the second control instructions indicating the second antenna port configuration, generate second communication signals for the antenna ports based on the second user signals and the second antenna port configuration where the second antenna port configuration allocates the second communication signals among the antenna ports, and transmit the second communication signals to the antenna ports for wireless transfer to the user devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
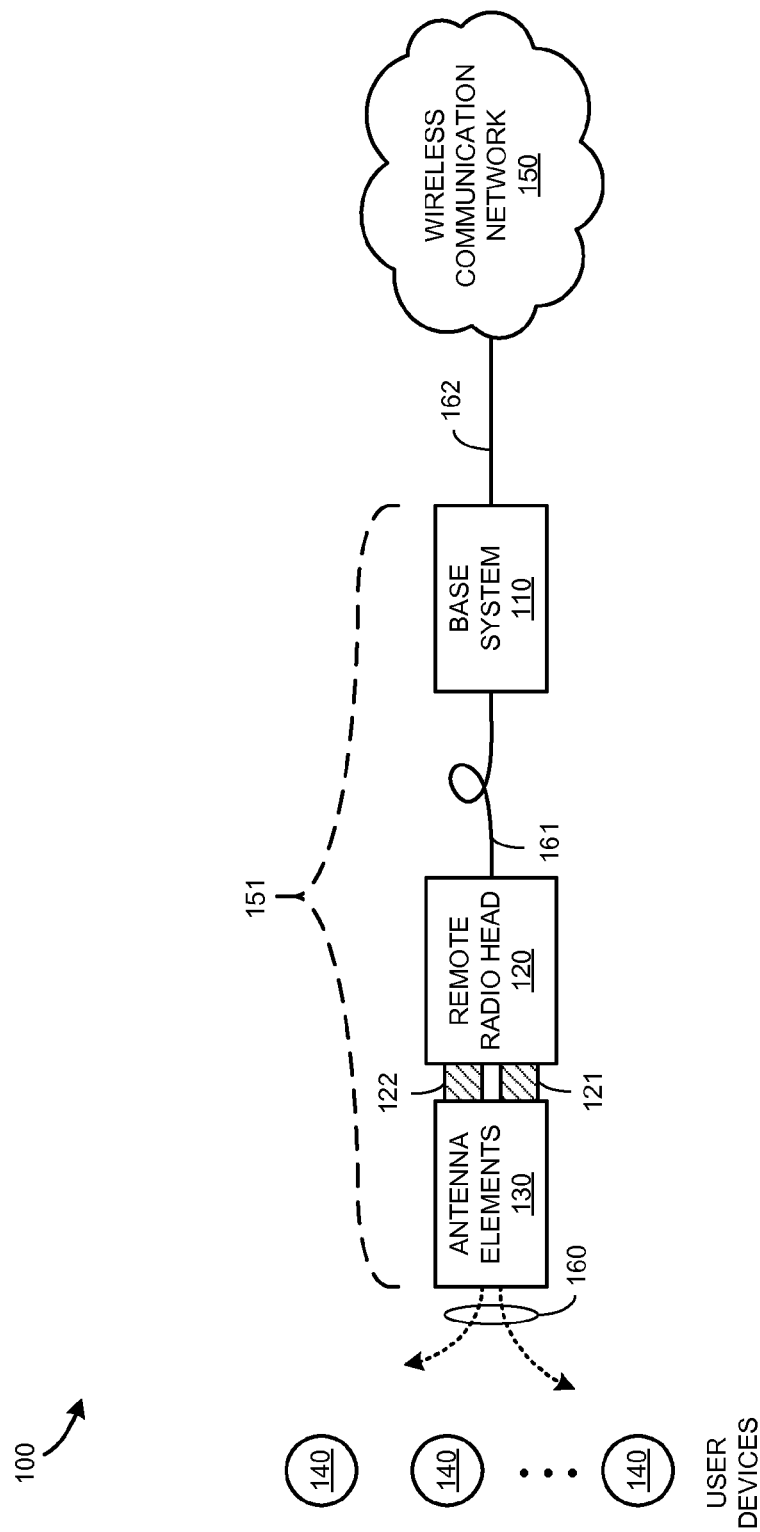
FIG. 1 is a system diagram illustrating a communication system.

FIG. 1 is a system diagram illustrating communication system 100. Communication system 100 includes base system 110, remote radio head 120, antenna elements 130, user devices 140, and wireless communication network 150. User devices 140 receive wireless access to communication services over wireless links 160. Although multiple wireless links 160 are shown in FIG. 1, it should be understood that the wireless links could be shared or distributed among user devices. Wireless communication network 150 and base system 110 communicate over link 162. Base system 110 and remote radio head communicate over link 161. In this example, link 161 is configured to communicate control instructions and user signals, although separate links could be used. Remote radio head 120 and antenna elements 130 communicate over antenna ports 121-122.

In FIG. 1, the elements shown as included in system 151 could comprise the elements of a wireless transmission system, such as a wireless access node or a base station, although other configurations could be employed. Antenna elements 130 are driven by remote radio head 120 in this example through antenna ports 121-122. Remote radio head 120 could be configured to transmit communication signal types of different wireless protocols, carrier frequencies, or power levels, and could transmit combined communication signal types over each of antenna ports 121-122. Although system 151 is shown in FIG. 1 for transmission of wireless communications, it should be understood equipment for receiving wireless communications from user devices 140 could also be included, or handled by system 151.

Figure 2:
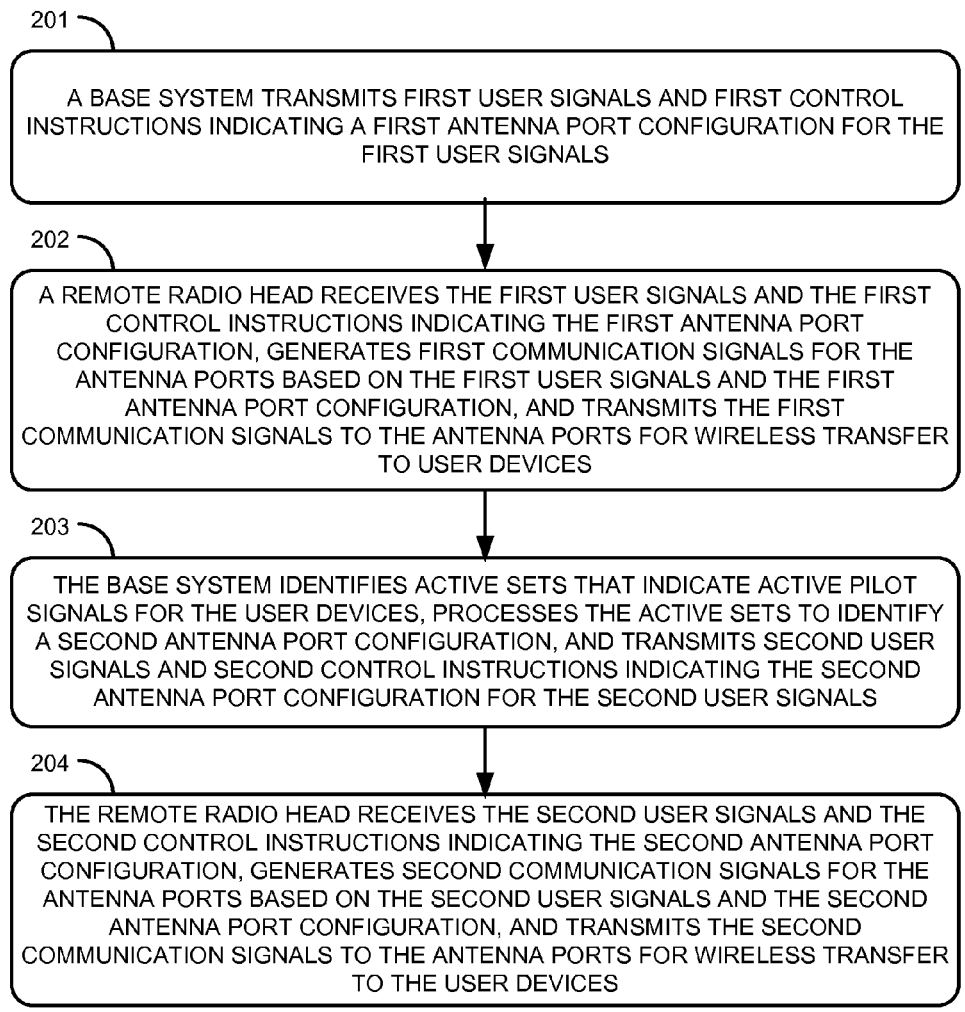
FIG. 2 is a flow diagram illustrating a method of operation of a wireless transmission system.

FIG. 2 is a flow diagram illustrating a method of operation of wireless transmission system 151. The operations of FIG. 2 are referenced herein parenthetically. In FIG. 2, base system 110 transmits (201) first user signals and first control instructions indicating a first antenna port configuration for the first user signals. In this example, the first user signals and first control instructions are transferred over link 161. The first user signals and first control instructions may be received over link 162 from wireless communication network 150, or may originate in base system 110. Typically the user signals include user communications for communication services, such as voice calls, text messages, e-mail, or Internet services, and the control instructions include operational instructions for control, administration, and operation of remote radio head 120. It should be understood that additional overhead communications, such as communication protocol overhead, packet headers, or other overhead information related to user communications could be included in the user signals.

Remote radio head 120 receives (202) the first user signals and the first control instructions indicating the first antenna port configuration, generates first communication signals for antenna ports 121-122 based on the first user signals and the first antenna port configuration, and transmits the first communication signals to antenna ports 121-122 for wireless transfer to user devices 140. The first antenna port configuration can indicate first ones of antenna ports 121-122 for allocating first communication signals among and first power levels for transmitting the first communication signals at each of the first ones of antenna ports 121-122. The first communication signals are typically allocated across at least one of antenna ports 121-122. In some examples, the first communication signals are allocated among more than one antenna port, and could include multiple-input multiple-output (MIMO) signaling configurations. In other examples, the first control instructions indicate to transfer at least a first portion of the first user signals as the first communication signals, where the first communication signals comprise the first portion of the first user signals for transmission using a first wireless communication protocol, first radio frequency (RF) power, and first carrier frequency. The first control instructions could also indicate to transfer a second portion of the first user signals using a second wireless communication protocol, second radio frequency RF power, and second carrier frequency. In some examples, the first portion and the second portion are transmitted over the same one or ones of antenna ports 121-122.

Base system 110 identifies (203) active sets that indicate active pilot signals for user devices 140, processes the active sets to identify a second antenna port configuration, and transmits second user signals and second control instructions indicating the second antenna port configuration for the second user signals. Although FIG. 1 shows equipment for one wireless access node, namely system 151, further wireless access nodes could be included which are associated with wireless communication network 150. Each wireless access node typically transmits at least one pilot signal indicating parameters related to wireless access from the associated wireless access node. User devices 140 each monitor pilot signals of various wireless access nodes, including system 151, during normal operation. User devices 140 may each detect pilot signals at different signal strengths or signal qualities, and may thus each selectively identify various arrangements of pilot signals in active sets. The active sets could comprise pilot signals exceeding a certain signal strength, pilot signals of wireless access nodes that user devices 140 are in a soft handoff with, or could include a listing of wireless access nodes within wireless range for potential communication for future handoffs or handovers, among other configurations. Base system 110 could identify the active sets by requesting them from ones of user devices 140, or user devices 140 could periodically transfer information regarding the active sets to base system 110, or to other elements of wireless communication network 150, and base system 110 could identify these active sets periodically.

Processing the active sets to identify the second antenna port configuration may include base system 110 identifying a modified quantity of antenna ports for remote radio head 120 to allocate the first communication signals among, based on the active sets. Processing the active sets to identify the second antenna port configuration could also include base system 110 identifying an average number of active pilot signals in the active sets and if the average number of active pilot signals falls below a threshold number of active pilot signals, then increasing a quantity of antenna ports for remote radio head 120 to allocate the first communication signals among.

Remote radio head 120 receives (204) the second user signals and the second control instructions indicating the second antenna port configuration, generates second communication signals for antenna ports 121-122 based on the second user signals and the second antenna port configuration, and transmits the second communication signals to antenna ports 121-122 for wireless transfer to user devices 140. The second antenna port configuration could indicate second ones of antenna ports 121-122 for allocating second communication signals among and second power levels for transmitting the second communication signals at each of the second ones of antenna ports 121-122. For example, if operation 203 indicates to increase a quantity of antenna ports for remote radio head 120 to allocate the first communication signals among, then the second communication signals could be allocated across an increased quantity of antenna ports 121-122. Power levels for transmitting the first communication signals could also be altered in response to the second antenna port configuration and new power levels used for transmitting the second communication signals. In further examples, a MIMO configuration could be altered based on the second antenna port configuration, such as changing a number of carrier frequencies, changing a number of antenna ports for transmission of a single shared carrier, or changing a power level, among other changes.

Figure 3:
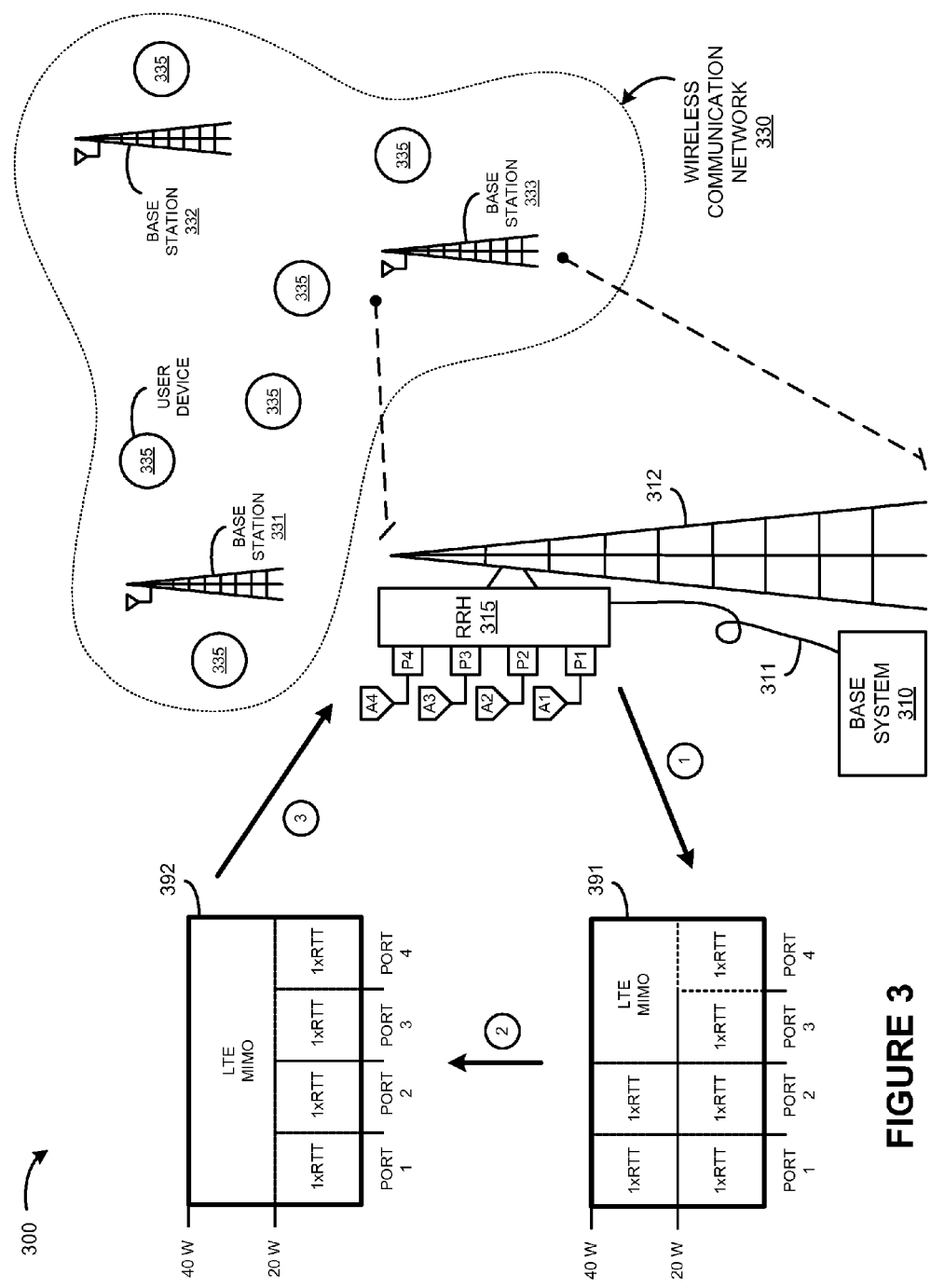
FIG. 3 is a system diagram illustrating a communication system.

FIG. 3 is a system diagram illustrating communication system 300. Communication system 300 includes base stations 331-333 and user devices 335. Base stations 331-333 are included in wireless communication network 330, which could also include further base stations, wireless access nodes, and other communication systems. Base station 333 is also shown in an enhanced component view, and includes base system 310, support structure 312, and remote radio head (RRH) 315. Base system 110 and RRH 315 communicate over link 311, which is an optical link in this example. RRH 315 includes antenna ports P1-P4 and antenna elements A1-A4, with each antenna element associated with an antenna port. It should be understood that base stations 331-333 could include similar equipment, as well as additional equipment than that shown for base station 333.

In operation, the elements of wireless communication network 330 provide wireless access to communication services for user devices 335. The communication services are provided over wireless links, not shown in FIG. 3 for clarity, and can include voice calls, text messages, or data access, among other communication services. Each base station 331-333 provides the wireless access over a limited geographic area, called a wireless coverage area. The dotted outline associated with wireless communication network 330 also represents the combined wireless coverage areas for base stations 331-333. It should be understood the wireless coverage area shown in FIG. 3 is merely representative, and could include different configurations based on signal quality, weather, geography, obstructions, quantity of base stations, or other conditions. Also in FIG. 3, each of user devices 335 is a mobile communication device, and can be moved throughout wireless communication network 330.

FIG. 3 also includes antenna port configurations 391 and 392. These antenna port configurations indicate example wireless communication technologies and power levels that are used for each of antenna ports P1-P4. This example, as well as other examples, will be discussed further in FIG. 4.

Base system 310 includes processing systems, transceivers, routers, computer-readable storage systems, among other equipment. Base system 310 receives user communications from external systems, such as other systems of wireless communication network 330 and transfers these user communications over link 311. Additionally, base system 310 determines control instructions, such as antenna port configurations, for RRH 315 and transfers these control instructions over link 311. In this example, link 311 is an optical link, and includes communications for both the user communications and the control instructions. Additional communications could be included, such as overhead communications for communication protocols. Although base system 310 is shown as located at the base of support structure 312, in other examples, base system 310 could be located remotely from support structure 312, such as in a centralized data center or communications structure.

Remote radio head (RRH) 315 includes processing systems, amplifiers, transceivers, filters, routers, modulators, computer-readable storage systems, among other equipment for transmission of radio frequency (RF) signals and/or wireless signals using various wireless communication protocols and carrier frequencies. RRH 315 receives user communications from base system 310 over link 311, and transfers the user communications as RF signals over selected ones of antenna ports P1-P4. RRH 315 could process and modify the user communications, such as including the communications within wireless communication protocol structures, data structures, or for apportioning among communication channels, frequencies, timeslots, or other configurations. RRH 315 also receives control instructions from base system 310 over link 311, and in response to the control instructions, modifies antenna port configurations. As shown in FIG. 3, RRH 315 includes four antenna ports, namely P1-P4, which are each associated with an antenna element, namely A1-A4. Antenna ports P1-P4 can transfer RF signals to the associated antenna elements A1-A4, where antenna elements A1-A4 transfer the RF signals as wireless signals for receipt by ones of user devices 335. In this example, each of antenna ports P1-P4 can transfer more than one wireless signal simultaneously. Although transmission is discussed in this example, it should be understood that elements described in FIG. 3 could also receive wireless communications from user devices.

Support structure 312 includes a physical support for RRH 315 and associated antenna elements. In this example, RRH 315 is mounted on support structure 312, and is configured to conform to weight, wind loading, and structural limitations for mounting on support structure 312. Support structure 312 could comprise a tower, antenna mounts, cable guides, among other structural support equipment. In other examples, support structure 312 includes antenna mounts, enclosures, or support structure for RRH 315 and is mounted on an existing structure, such as a building or other architectural element.

Figure 4:
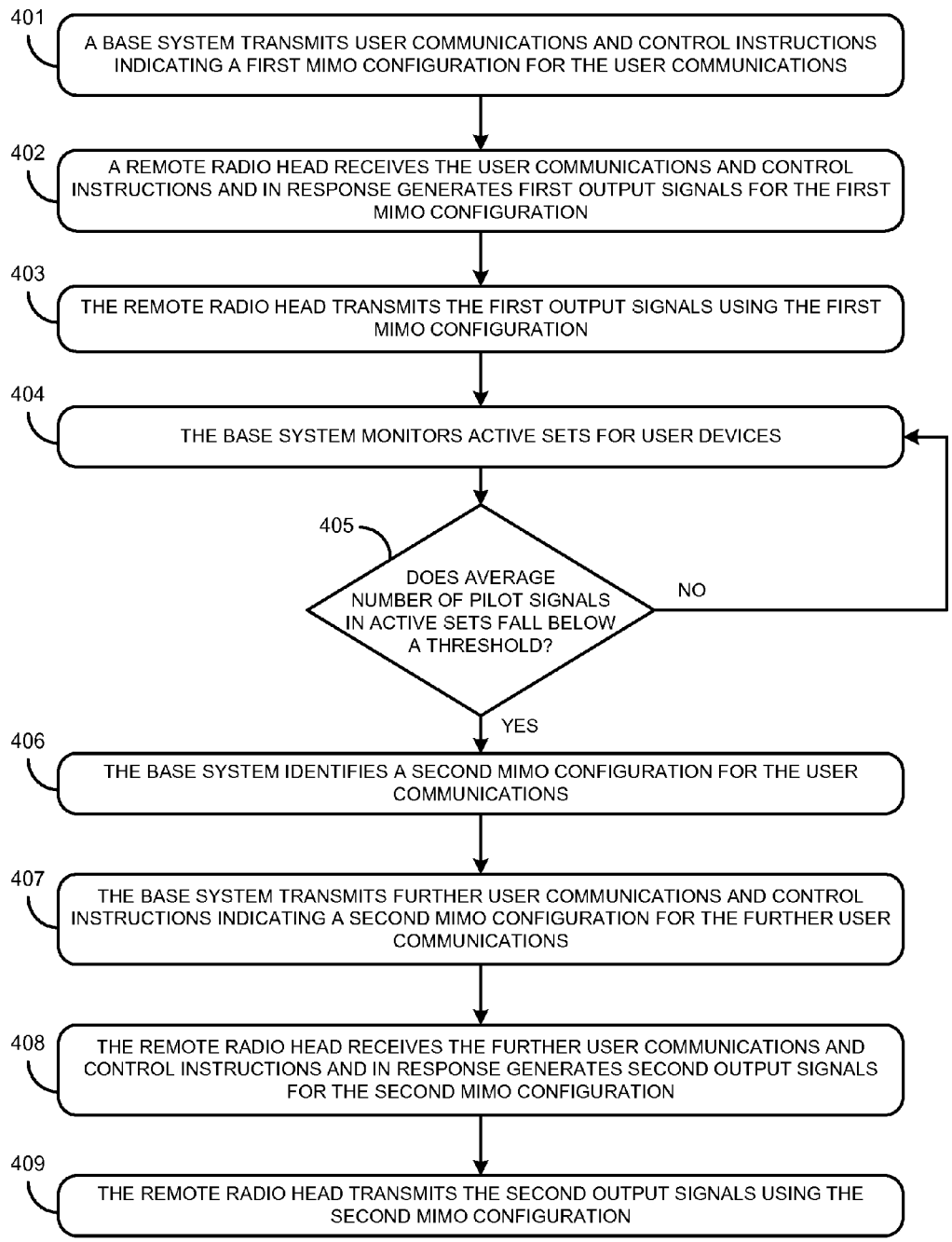
FIG. 4 is a flow diagram illustrating a method of operation of a communication system.

FIG. 4 is a flow diagram illustrating a method of operation of communication system 300. The operations in FIG. 4 are referenced herein parenthetically. In FIG. 4, base system 310 transmits (401) user communications and control instructions indicating a first multiple-input multiple-output (MIMO) configuration for the user communications. The first user communications include communications for any ones of user devices 335, such as voice communications, data communications, text messages, Internet communications, streaming video or audio, or other communications, including combinations thereof. The user communications could include communications intended for transfer over different wireless communication protocols.

For example, a first portion of the user communications could be for wireless transfer using the MIMO configuration, and for transfer using a first wireless communication protocol, which could include an associated carrier frequency or frequencies. Likewise, a second portion of the user communications could be for transfer using a second wireless communication protocol, which could include different associated carrier frequencies than the first portion of the user communications. Further portions of the user communications could be transferred by base system 310 for transfer by RRH 315 using further antenna port configurations. Thus, multiple forms of user communications are transferred by base system 310 for eventual wireless transmission by RRH 315. The configuration of antenna ports P1-P4 and consequently the wireless signals transmitted by antenna elements A1-A4 determines which portions of the user communications are transferred thereby as well as a transmit power and carrier frequency used by RRH 315 for each portion of the user communications.

The control instructions typically include command and control instructions for controlling the operations of RRH 315, and in this example includes a first MIMO configuration. The first MIMO configuration indicates several parameters, including a number of transmitters over which to transmit user communications using a particular shared carrier frequency, such as 1T, 2T, or 4T configurations, as well as a power level for transmission of these user communications. The first MIMO configuration could also indicate a type of MIMO to be used for transmitting the user communications, such as a spatial multiplexing configuration, an antenna diversity coding configuration, or a space-time coding configuration, among other MIMO configuration parameters. The control instructions could indicate other information, such as communication parameters to be used for the user communications, including amplification parameters, filtering parameters, wireless protocols, carrier frequencies, coding schemes, spreading codes, channel assignments, or other information. Additionally, the control instructions could indicate antenna port configurations for non-MIMO communication modes, such as single carrier modes, single-input single-output (SISO) modes, or other auxiliary wireless carriers.

Remote radio head (RRH) 315 receives (402) the user communications and control instructions and in response generates first output signals for the first MIMO configuration. In this example, RRH 315 includes four antenna ports, P1-P4, for transmitting the first output signals over associated antenna elements A1-A4. Each antenna port P1-P4 can be configured independently. FIG. 3 illustrates arrowed step '1' for the first MIMO configuration with associated antenna port configuration 391. Antenna port configuration 391 includes two different types of wireless communications, namely 1×RTT and LTE MIMO, as well as a number of antenna ports and transmit powers over which to transmit the associated wireless communications for receipt by ones of user devices 335. Each antenna port in this example can transmit up to 40 watts (W), and is able to subdivide this 40 W maximum power into two 20 W portions. Also, each of the two 20 W portions can carry different wireless communication protocols, which could include different carrier frequencies. Thus, antenna port configuration 391 includes eight 'slots'—where each slot is indicated by a wireless protocol type and a power level. In some examples, only the LTE MIMO configuration is transferred by base system 310 and any remaining port/power slots are responsively filled by RRH 315 for 1×RTT communications. In other examples, both the LTE MIMO antenna port configurations and the 1×RTT antenna port configurations are transferred by base system 310.

RRH 315 transmits (403) the first output signals using the first MIMO configuration, namely using antenna port configuration 391. As shown in FIG. 3, antenna port configuration 391 includes both an associated antenna port and power level for the first output signals. In this example, the first output signals comprise RF signals for transfer to antenna elements A1-A4, where antenna elements A1-A4 then transmit the RF signals as wireless signals over wireless links to ones of user devices 335. Thus, RRH 315 transmits six instances of 1×RTT single transmitter (1T) signals at 20 W each and one instance of LTE two-transmitter (2T) MIMO signals at 20 W. Each of the individual instances of 1×RTT corresponds to individual carrier frequencies, with each carrier frequency at a different frequency. The one instance of LTE 2T MIMO corresponds to a single carrier frequency, but the single shared carrier frequency is used allocated two antenna ports, namely P3 and P4.

The first output signals are generated based on the user communications transferred by base system 310. In some examples, the user communications are transferred over separate input portions of link 311, and the separate input portions are apportioned among the various output antenna ports P1-P4 by RRH 315 according to the antenna port configuration. For example, base system 310 could transfer six portions of the user communications for the 1×RTT traffic and one portion of the user communications for the LTE traffic. In other examples, base system 310 transfers the user communications in a combined form and RRH 315 separates the user communications and apportions the user communications into the 1×RTT and LTE portions. RRH 315 could also determine protocol-specific portions of the first output signals, such as timings, modulations, overhead communications, control communications, headers, flow control, spreading codes, channelization, or other wireless communication protocol portions of the first output signals. In some examples, RRH 315 encapsulates the input user communications in the proper format for wireless transfer over the associated wireless communication protocol. In other examples, base system 310 includes instructions with the user communications to indicate which wireless communication protocol or carrier frequency to employ for various portions of the user communications.

Base system 310 monitors (404) active sets for user devices 335. An active set comprises an indication of active pilot signals for user devices. In typical examples, a user device may maintain several lists of pilot signals from base stations that are presently being detected. Base stations typically transmit pilot signals to broadcast basic details about the base station, such as identifiers, location, protocols supported, or other information that a user device can use to request wireless access from the base station. Depending upon signal quality, distance, or other factors, user devices may place various detected pilot signals into different categories, as reflected in various lists of pilot signals. The list which indicates the most active pilot signals is typically referred to as the active set. This active set could indicate pilot signals of a certain signal quality, signal strength, or indicate base stations with which the user device is engaged in a form of soft handoff. Other configurations of active sets could be employed. Additionally, the active sets may be maintained in computer-readable storage by either the user devices themselves, or by equipment of wireless communication network 330, such as backend computer servers, authentication systems, or base station equipment, among other systems. In this example, six user devices 335 are shown in the vicinity of base stations 331-333. As mentioned above, depending upon signal quality or other factors, the active sets associated with each of user devices 335 may vary. Thus, some user devices may identify more pilot signals in their active sets than other user devices.

Base system 310 monitors the active sets for user devices currently in communication with base system 310, such as user devices registered for wireless access from RRH 315, user devices monitoring a pilot signal associated with RRH 315, or user devices in a soft handoff with RRH 315. Base system 310 could receive the active set information from user devices, such as by a requested or periodic transfer, or receive the active set information from other systems of wireless communication network 330. In examples where base system 310 receives the active set information from user devices, the user devices could wirelessly transfer the active set information for receipt by RRH 315 and subsequent transfer to base system 310 in a pilot strength measurement message (PSMM) or other protocol-specific message. In further examples, other systems monitor the active sets for many user devices across wireless communication network 330—even those user devices not presently in communication with base system 310.

If the average number of pilot signals in the active sets does not fall below a threshold (405), then base system 310 continues to monitor (404) active sets for user devices 335. However, if the average number of pilot signals in the active sets falls below a threshold (405), then in response base system 310 identifies (406) a second MIMO configuration for the user communications. In this example, the threshold indicates an average number of pilot signals across all user devices in the wireless coverage area of RRH 315, namely the user devices which are actively receiving wireless access through RRH 315. If the number of pilot signals in each active set exceeds the threshold, then on average the user devices are detecting multiple communication pathways for wireless access, namely through the other pilot signals and associated base stations. However, if the number of pilot signals in each active set falls below the threshold, then—on average—the user devices are detecting fewer potential communication pathways for wireless access. The fewer potential communication pathways can lead to a reduced quality of wireless access. Responsively, base system 310 determines a second MIMO configuration which increases the number of antenna ports for RRH 315 to transmit the wireless signals, namely the LTE MIMO signals in this example. Although the threshold number of pilot signals discussed above could vary due to present conditions, in this example, if the average number of pilot signals in the active sets is less than three, then base system 310 identifies the second MIMO configuration.

The second MIMO configuration is illustrated by antenna port configuration 392. The second MIMO configuration could include similar information and parameters as antenna port configuration 391, as identified in operation 406. As discussed above for the first MIMO configuration, antenna port configuration 392 includes two different types of wireless communications, namely 1×RTT and LTE, as well as a number of antenna ports and transmit powers over which to transmit the associated wireless communications for receipt by ones of user devices 335. In this example, the second MIMO configuration increases a number of transmit ports for the LTE MIMO signals from 2T in antenna port configuration 391 to 4T in antenna port configuration 392. Thus, antenna ports P1-P4 are each to transmit the LTE MIMO signals. The transmit power for each antenna port for the LTE MIMO signals remains at 20 W. The second MIMO configuration could also indicate a type of MIMO to be used for transmitting user communications, such as a spatial multiplexing configuration, an antenna diversity coding configuration, or a space-time coding configuration, among other MIMO configuration parameters.

Base system 310 transmits (407) further user communications and control instructions indicating a second MIMO configuration for the further user communications. In some examples, only the LTE MIMO configuration is transferred by base system 310 and any remaining port/power slots are responsively filled by RRH 315 for 1×RTT communications. In other examples, both the LTE MIMO antenna port configurations and the 1×RTT antenna port configurations are transferred by base system 310. As with the first control instructions, the further control instructions could indicate other information, such as communication parameters to be used for the user communications, including amplification parameters, filtering parameters, wireless protocols, carrier frequencies, coding schemes, spreading codes, channel assignments, or other information. Additionally, the further control instructions could indicate antenna port configurations for non-MIMO communication modes, such as single carrier modes, single-input single-output (SISO) modes, or other auxiliary wireless carriers.

The further user communications include communications for any ones of user devices 335, such as voice communications, data communications, text messages, Internet communications, streaming video or audio, or other communications, including combinations thereof. The further communications could include communications intended for transfer over different wireless communication protocols. For example, a first portion of the further user communications could be for wireless transfer using the MIMO configuration, and for transfer using a first wireless communication protocol, which could include an associated carrier frequency or frequencies. Likewise, a second portion of the further user communications could be for transfer using a second wireless communication protocol, which could include different associated carrier frequencies than the first portion of the user communications. Further portions of the further user communications could be transferred by base system 310 for transfer by RRH 315 using additional antenna port configurations. Thus, multiple forms of user communications are transferred by base system 310 for eventual wireless transmission by RRH 315. The configuration of antenna ports P1-P4 and consequently the wireless signals transmitted by antenna elements A1-A4 determines which portions of the further user communications are transferred thereby as well as a transmit power and carrier frequency used by RRH 315 for each portion of the further user communications.

RRH 315 receives (408) the further user communications and control instructions and in response generates second output signals for the second MIMO configuration. FIG. 3 illustrates arrowed step '2' for the second MIMO configuration with associated antenna port configuration 392. Thus, antenna port configuration 392 includes eight 'slots'— where each slot is indicated by a wireless protocol type and a power level. In some examples, only the LTE MIMO configuration is transferred by base system 310 and any remaining port/power slots are responsively filled by RRH 315 for 1×RTT communications. In other examples, both the LTE MIMO antenna port configurations and the 1×RTT antenna port configurations are transferred by base system 310.

The second output signals are generated based on the further user communications transferred by base system 310. In some examples, the further user communications are transferred over separate input portions of link 311, and the separate input portions are apportioned among the various output antenna ports P1-P4 by RRH 315 according to the antenna port configuration. For example, base system 310 could transfer four portions of the further user communications for the 1×RTT traffic and one portion of the further user communications for the LTE traffic. In other examples, base system 310 transfers the further user communications in a combined form and RRH 315 separates the user communications and apportions the user communications into the 1×RTT and LTE portions. RRH 315 could also determine protocol-specific portions of the second output signals, such as timings, modulations, overhead communications, control communications, headers, flow control, spreading codes, channelization, or other wireless communication protocol portions of the second output signals. In some examples, RRH 315 encapsulates the further input user communications in the proper format for wireless transfer over the associated wireless communication protocol. In other examples, base system 310 includes instructions with the further user communications to indicate which wireless communication protocol or carrier frequency to employ for various portions of the further user communications.

RRH 315 transmits (409) the second output signals using the second MIMO configuration, namely using antenna port configuration 392. As shown in FIG. 3, antenna port configuration 392 includes both an associated antenna port and power level for the second output signals. In this example, the second output signals comprise RF signals for transfer to antenna elements A1-A4, where antenna elements A1-A4 then transmit the RF signals as wireless signals over wireless links to ones of user devices 335. Thus, RRH 315 transmits four instances of 1×RTT single transmitter (1T) signals at 20

W each and one instance of LTE four-transmitter (4T) MIMO signals at 20 W. Each of the individual instances of 1×RTT corresponds to individual carrier frequencies, with each carrier frequency at a different frequency. The one instance of LTE 4T MIMO corresponds to a single shared carrier frequency, but the single shared carrier frequency is used across four antenna ports, namely P1-P4.

Although in FIGS. 3 and 4 two wireless communication protocols are discussed regarding antenna port configurations 391-392, it should be understood that a different arrangement of wireless communication protocols and antenna port configurations could be employed. For example, a first wireless communication protocol could be employed in a non-MIMO mode, and based on the active sets in operation 406, a MIMO mode becomes preferred and engaged in by RRH 315 due to instructions from base system 310. Additionally, different protocols could be employed, such as those discussed herein for wireless link 160, including combinations thereof. Furthermore, it should be understood that the carrier frequencies discussed herein are employed as carrier frequencies for modulated output signals or output communications.

Also, although FIGS. 2-4 discuss monitoring and processing active sets of wireless user devices, other parameters could be monitored to determine a new antenna port configuration. Wireless communication network utilization could be monitored and processed to determine different antenna port configurations. This utilization could be processed separately from, or in addition to, the active set monitoring discussed herein. The utilization could be monitored directly by identifying a quantity of active communication sessions, amount of data usage, or other factors, or could be identified indirectly by timing the utilization to certain times of the day, such as peak hours. During times of high wireless access utilization, such as during prime business hours or evenings, the antenna port configurations could be modified. The peak usage hours could also be further customized based on the type of communications typically engaged in during the peak utilization times. For example, during peak business hours voice communications may be identified to be at a higher utilization level than data communications. In response, the number of active carriers or active transmitters for a data communication technology could be reduced, such as a 4T MIMO mode being reduced to a 2T MIMO mode or even to a non-MIMO mode in favor of voice communications, such as 1×RTT or GSM communications. Likewise, during non-peak business hours data communications may be identified to be at a higher utilization level than voice communications. In response, the number of active carriers for a voice communication protocol could be reduced, such as a six carriers for voice communications being reduced to two carriers, in favor of increased carriers for data communications, such as LTE or WiMAX communications, or in favor an increased number of MIMO transmitters. It should be understood that other utilization schemes and responses could be employed, as well as different wireless communication technologies.

Figure 5:
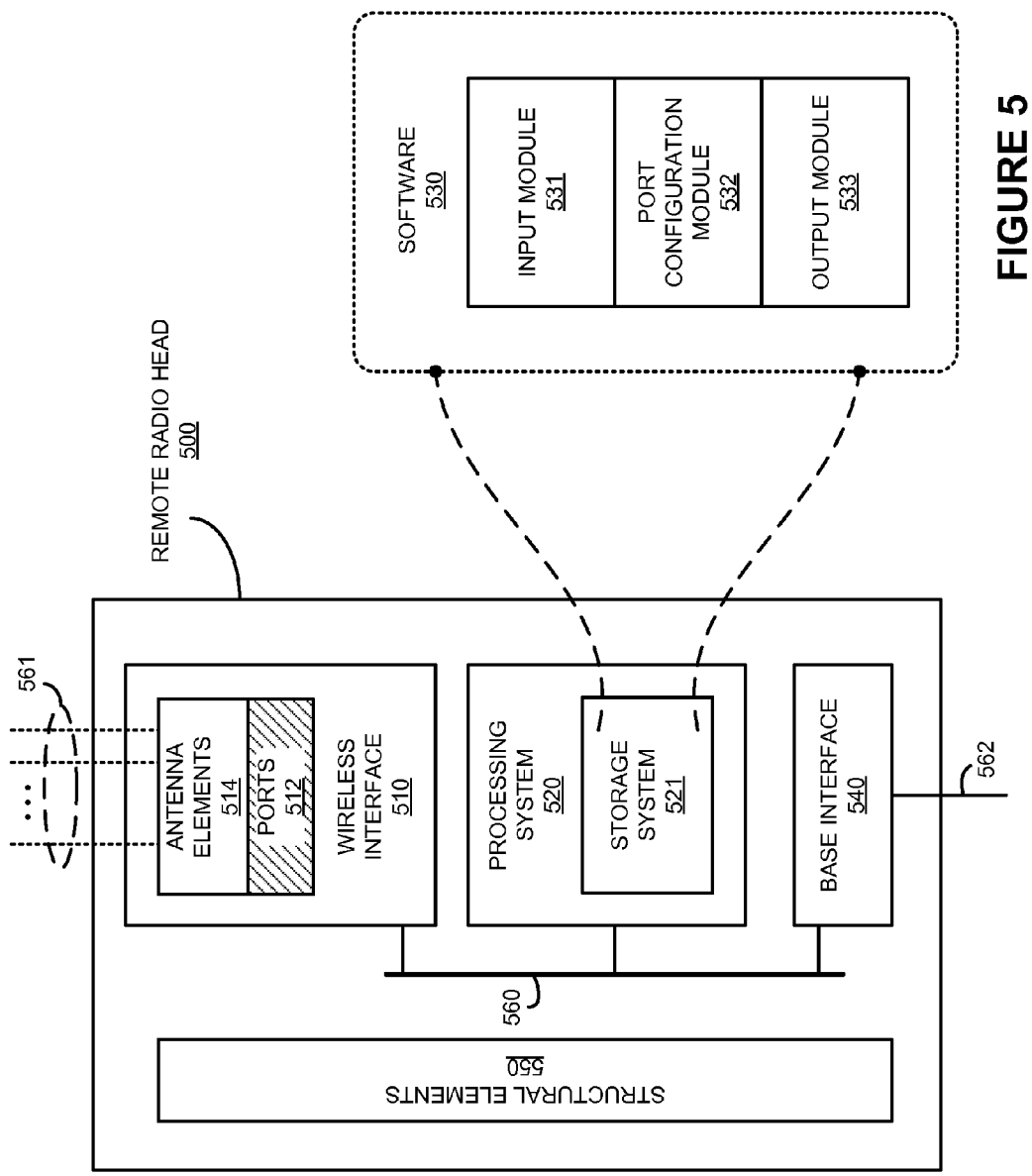
FIG. 5 is a block diagram illustrating a remote radio head.

FIG. 5 is a block diagram illustrating remote radio head 500, as an example of elements of remote radio head 120 found in FIG. 1, or RRH 315 found in FIG. 3, although remote radio head 120 or RRH 315 could use other configurations. Remote radio head 500 includes wireless interface 510, processing system 520, base interface 540, and structural elements 550. Wireless interface 510, processing system 520, and base interface 540 are shown to communicate over a common bus 560 for illustrative purposes. It should be understood that discrete links could be employed, such as data links, power links, optical links, RF links, or other links. Remote radio head 500 may be distributed or concentrated among multiple elements that together form the elements of FIG. 5.

Wireless interface 510 comprises transceiver, modulation, filtering, multiplexer/de-multiplexer, signal processing, and amplifier circuitry for communicating with user devices using wireless communication protocols. Wireless interface 510 also includes ports 512 and antenna elements 514. Wireless interface 510 transfers RF communications over ports 512 for wireless transmission by antenna elements 514. Ports 512 include a plurality of configurable RF antenna ports which receive RF energy and signals from wireless interface 510 for transfer to antenna elements 514. Antenna elements 514 include a plurality of antenna elements and support structures for wirelessly transmitting wireless communications to user devices over wireless links 561. Wireless interface 510 also receives command and control information and instructions from processing system 520 or base interface 540 for controlling the operations of wireless communications over wireless links 561. Wireless links 561 could each use various protocols or communication formats as described herein for wireless links 160, including combinations, variations, or improvements thereof. It should be understood that wireless signals could also be received by antenna elements 514 for transfer over ports 512 to wireless interface 510.

Processing system 520 includes storage system 521. Processing system 520 retrieves and executes software 530 from storage system 521. In some examples, processing system 520 is located within the same equipment in which wireless interface 510 or base interface 540 are located. In further examples, processing system 520 comprises specialized circuitry, and software 530 or storage system 521 could be included in the specialized circuitry to operate processing system 520 as described herein. Storage system 521 could include a non-transitory computer-readable medium such as a disk, tape, integrated circuit, server, flash memory, phase change memory, magnetic memory, optical memory, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as receive user communications and/or control instructions, and configure antenna ports, among other operations.

In this example, software 530 includes input module 531, port configuration module 532, and output module 533. It should be understood that a different configuration could be employed, and individual modules of software 530 could be included in different equipment than remote radio head 500. Input module 531 receives user communications and control instructions as received by base interface 540. Output module 533 processes the user communications for transfer over wireless interface 510. Output module 533 could modify the user communications according to a wireless communication protocol, such as channelize, packetize, apply spreading codes, or otherwise prepare user communications for wireless transfer. In many examples, output module 533 determines a multiple-input multiple output (MIMO) configuration for the user communications, where the user communications are transferred over multiple antenna elements by wireless interface 510. In MIMO communication modes, the user communications could be multiplexed across multiple communication channels, or have a diversity coding applied. Wireless interface 510 could also perform output functions as described for output module 533. Port configuration module 532 processes the control instructions as received by base interface 540 and determines how to apply the control instructions for configuring ports 512. The port configuration could be based on port configuration instructions received in the control instructions, or port configuration module 532 itself could determine the port configuration, including combinations thereof. The port configuration relates to which ports of ports 512 are configured to transfer which type of wireless communication signals, and at what power amplification level. The port configuration could include transferring multiple wireless communication signals of different wireless communication types over a signal port, or could include MIMO port configurations for transferring communications over multiple ones of ports 512.

Base interface 510 comprises network interfaces, router equipment, and optical transceiver equipment for communicating with wireless communication provider equipment, such as with base systems, base station equipment, or other equipment of wireless communication networks, including communicating over the Internet, or over other communication systems. Wireless interface 510 exchanges communications over link 562, such as exchanging user communications and receiving control instructions. Link 562 could use various protocols or communication formats as described herein for links 161-162, or 311, including combinations, variations, or improvements thereof.

Structure 550 comprises a mounting structure for securing remote radio head 500 to another support structure, such as tower, building, or other architectural element. Structure 550 could comprise brackets, fasteners, couplers, cable guides, antenna mounts, or other structural and mounting elements. Structure 550 could also include an enclosure for remote radio head 500 and internal structural elements for mounting and encasing the various elements of remote radio head 500.

Bus 560 comprises a physical, logical, or virtual communication link, capable of communicating data, control signals, and communications, along with other information. In some examples, bus 560 is encapsulated within the elements of wireless interface 510, processing system 520, or base interface 540, and may be a software or logical link. In other examples, bus 560 uses various communication media, such as air, space, metal, optical fiber, or some other signal propagation path, including combinations thereof. Bus 560 could be a direct link or might include various equipment, intermediate components, systems, and networks. Bus 560 could be a common link, shared link, or may be comprised of discrete, separate links.

Referring back to FIG. 1, user devices 140 each comprise transceiver circuitry and communication elements. The transceiver circuitry typically includes amplifiers, filters, modulators, and signal processing circuitry. User devices 140 may also each include user interface systems, memory devices, non-transitory computer-readable storage mediums, software, processing circuitry, or some other communication components. User devices 140 may each be a user device, wireless communication device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof. Although three user devices are shown in FIG. 1, it should be understood that a different number of user devices could be included. User devices 140 could each include multiple transceiver portions or antenna portions, among other circuit and equipment elements, for communicating wirelessly with multiple wireless communication networks, using different wireless communication modes or wireless communication protocols.

Wireless communication network 150 comprises communication and control systems for providing wireless access to communication services for user devices over a geographic region. Wireless communication network 150 includes equipment to provide wireless access to communication services within different coverage areas to user devices, route communications between content providers and user devices, and receive and process registration and content requests, among other operations. Wireless communication network 150 may also comprise wireless access nodes, wireless access node controllers, base stations, base systems, remote radio heads, antenna towers, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, wireless data access points, routers, databases, switchover processors, or other communication and control equipment. In typical examples, wireless communication network 150 comprises different wireless technologies, such as different wireless protocols, wireless frequency spectrum, generations of wireless technology, or wireless communication modes.

Base system 110 includes processing systems, transceivers, routers, computer-readable storage systems, among other equipment. Base system 110 receives user communications from external systems, such as other systems of wireless communication network 150 and transfers these user communications over link 161. Additionally, base system 110 determines control instructions, such as antenna port configurations, for remote readio head 120, and transfers these control instructions over link 161.

Remote radio head 120 includes processing systems, amplifiers, transceivers, filters, routers, computer-readable storage systems, among other equipment for transmission of radio frequency (RF) signals and/or wireless signals. Remote radio head 120 receives user communications from base system 110 over link 161, and transfers the user communications as RF signals over selected ones of antenna ports 121-122. Remote radio head 120 could process and modify the user communications, such as including the communications within wireless communication protocol structures, data structures, or for apportioning among communication channels, frequencies, timeslots, or other configurations. Remote radio head 120 also receives control instructions from base system 110 over link 161, and in response to the control instructions, modifies antenna port configurations. As shown in FIG. 1, remote radio head 120 includes two antenna ports 121-122 which are each associated with antenna element portions of antenna elements 130. Antenna ports 121-122 can transfer RF signals to the associated antenna elements 121-122, where antenna elements 130 transfer the RF signals as wireless signals for receipt by ones of user devices 140. In this example, each of antenna ports 121-122 can transfer more than one wireless signal simultaneously. Although transmission of signals is discussed in this example, it should be understood that elements described in FIG. 1 could also receive wireless communications from user devices.

Antenna elements 130 include a plurality of antenna elements and support structures for wirelessly transmitting wireless communications to user devices over wireless links 160. Antenna elements 130 receive RF energy over antenna ports 121-122 and transfer the RF energy wirelessly over wireless links 160.

Communication links 161-162 each use metal, glass, optical, air, space, or some other material as the transport media. Communication links 161-162 could each use various communication protocols, such as optical signaling, Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 161-162 could be a direct link or may include intermediate networks, systems, or devices, and could include a logical network link transported over multiple physical links.

Wireless links 160 each use the air or space as the transport media. Wireless links 160 may each use various protocols, such as Code Division Multiple Access (CDMA), Code Division Multiple Access 2000 (CDMA-2000), Evolution-Data Optimized (EV-DO), single-carrier radio transmission technology link (1×RTT), Worldwide Interoperability for Microwave Access (WiMAX), Global System for Mobile Communication (GSM), Universal Mobile Telecommunications System (UMTS), Long Term Evolution (LTE), Wireless Fidelity (Wi-Fi), High Speed Packet Access (HSPA), Radio Link Protocol (RLP), or some other wireless communication format, including combinations, improvements, or variations thereof. Although two main wireless links 160 are shown in FIG. 1, it should be understood that wireless links 160 are merely illustrative to show communication modes or wireless access pathways for user devices 140. In other examples, further wireless links could be shown, with portions of the further wireless links shared and used for different communication sessions and associated overhead communications.

Communication links 160-162 may each include many different signals sharing the same associated link, as represented by the associated lines in FIG. 1, comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless transmission system having a plurality of antenna elements that are driven by a corresponding plurality of radio frequency (RF) antenna ports, the method comprising:

in a base system, transmitting first user signals and first control instructions including a first antenna port configuration indicating first RF power levels for the first user signals and a first allocation of the RF antenna ports;

in a remote radio head, receiving the first user signals and the first control instructions, generating first RF communication signals for the RF antenna ports based on the first user signals and the first antenna port configuration, allocating the first RF communication signals among the RF antenna ports according to the first allocation of RF antenna ports, and driving the RF antenna ports with the first RF communication signals at the first RF power levels for wireless transfer to user devices;

in the base system, receiving a plurality of active sets transferred by the user devices, each active set associated with one of the user devices and indicating active pilot signals transmitted by one or more transmission systems, collectively processing the active sets to determine a second antenna port configuration indicating second RF power levels for second user signals and a second allocation of RF antenna ports, wherein the processing includes identifying an average number of active pilot signals in the active sets and increasing a quantity of RF antenna ports among which to allocate the first RF communication signals when the average number of active pilot signals falls below a threshold number, and transmitting the second user signals and second control instructions including the second antenna port configuration indicating the second RF power levels for the second user signals and the second allocation of RF antenna ports; and in the remote radio head, receiving the second user signals and the second control instructions, generating second RF communication signals for the RF antenna ports based on the second user signals and the second antenna port configuration, allocating the second RF communication signals among the RF antenna ports according to the second allocation of RF antenna ports, and driving the RF antenna ports with the second RF communication signals at the second RF power levels for wireless transfer to the user devices.

2. The method of claim 1, wherein the first antenna port configuration indicates first ones of the RF antenna ports for allocating the first RF communication signals among and the first RF power levels for transmitting the first RF communication signals at each of the first ones of the RF antenna ports, and wherein the second antenna port configuration indicates second ones of the RF antenna ports for allocating the second RF communication signals among and the second RF power levels for transmitting the second RF communication signals at each of the second ones of the RF antenna ports.

3. The method of claim 1, wherein the first control instructions indicate to transfer at least a first portion of the first user signals as the first RF communication signals, wherein the first RF communication signals comprise the first portion of the first user signals for transmission using a first wireless communication protocol, the first RF power levels, and first carrier frequency.

4. The method of claim 3, wherein the first wireless communication protocol comprises a Long-Term Evolution (LTE) wireless communication protocol.

5. The method of claim 3, wherein the first RF communication signals are allocated as first multiple-input multiple-output (MIMO) signals across at least two RF antenna ports.

6. The method of claim 1, wherein the first control instructions indicate to transfer a first portion of the first user signals using a first wireless communication protocol and first carrier frequency, and wherein the first control instructions further indicate to transfer a second portion of the first user signals using a second wireless communication protocol and second carrier frequency.

7. The method of claim 6, wherein the first wireless communication protocol comprises a Long-Term Evolution (LTE) wireless communication protocol, and wherein the second wireless communication protocol comprises a Code Division Multiple Access (CDMA) wireless communication protocol.

8. The method of claim 6, wherein the first portion of the first user signals are allocated as multiple-input multiple-output (MIMO) signals across at least two RF antenna ports, and wherein the second portion of the first user signals are allocated as single-input single-output (SISO) signals across at least one of the two RF antenna ports.

9. A wireless transmission system having a plurality of antenna elements that are driven by corresponding plurality of radio frequency (RF) antenna ports, comprising:
a base system configured to transmit first user signals and first control instructions including a first antenna port configuration indicating first RF power levels for the first user signals and a first allocation of the RF antenna ports;
a remote radio head configured to receive the first user signals and the first control instructions, generate first RF communication signals for the RF antenna ports based on the first user signals and the first antenna port configuration, allocating the first RF communication signals among the RF antenna ports according to the first allocation of RF antenna ports, and drive the RF antenna ports with the first RF communication signals at the first RF power levels for wireless transfer to user devices;
the base system configured to receive a plurality of active sets transferred by the user devices that indicate active pilot signals for the user devices, process the active sets to determine a second antenna port configuration indicating second RF power levels for second user signals and a second allocation of RF antenna ports, wherein to process the active sets the base system identifies an average number of active pilot signals in the active sets and increases a quantity of RF antenna ports among which to allocate the first RF communication signals when the average number of active pilot signals falls below a threshold number, and transmit the second user signals and second control instructions including the second antenna port configuration indicating second RF power levels for the second user signals and the second allocation of RF antenna ports; and
the remote radio head configured to receive the second user signals and the second control instructions, generate second RF communication signals for the RF antenna ports based on the second user signals and the second antenna port configuration, allocating the second RF communication signals among the RF antenna ports according to the second allocation of RF antenna ports, and drive the RF antenna ports with the second RF communication signals at the second RF power levels for wireless transfer to the user devices.

10. The wireless transmission system of claim 9, wherein the first antenna port configuration indicates first ones of the RF antenna ports for allocating the first RF communication signals among and the first RF power levels for transmitting the first RF communication signals at each of the first ones of the RF antenna ports, and wherein the second antenna port configuration indicates second ones of the RF antenna ports for allocating the second RF communication signals among and the second RF power levels for transmitting the second RF communication signals at each of the second ones of the RF antenna ports.

11. The wireless transmission system of claim 9, wherein the first control instructions indicate to transfer at least a first portion of the first user signals as the first RF communication signals, wherein the first RF communication signals comprise the first portion of the first user signals for transmission using a first wireless communication protocol, the first RF power levels, and first carrier frequency.

12. The wireless transmission system of claim 11, wherein the first wireless communication protocol comprises a Long-Term Evolution (LTE) wireless communication protocol.

13. The wireless transmission system of claim 11, wherein the first RF communication signals are allocated as first multiple-input multiple-output (MIMO) signals across at least two RF antenna ports.

14. The wireless transmission system of claim 9, wherein the first control instructions indicate to transfer a first portion of the first user signals using a first wireless communication protocol and first carrier frequency, and wherein the first control instructions further indicate to transfer a second portion of the first user signals using a second wireless communication protocol and second carrier frequency.

15. The wireless transmission system of claim 14, wherein the first wireless communication protocol comprises a Long-Term Evolution (LTE) wireless communication protocol, and wherein the second wireless communication protocol comprises a Code Division Multiple Access (CDMA) wireless communication protocol.

16. The wireless transmission system of claim 14, wherein the first portion of the first user signals are allocated as multiple-input multiple-output (MIMO) signals across at least two RF antenna ports, and wherein the second portion of the first user signals are allocated as single-input single-output (SISO) signals across at least one of the two RF antenna ports.

* * * * *